(12) United States Patent
Maguire

(10) Patent No.: US 8,870,138 B2
(45) Date of Patent: Oct. 28, 2014

(54) ATTACHMENTS, BRACKETS, AND SUPPORT ASSEMBLIES

(75) Inventor: Patrick David Maguire, Dunedin (NZ)

(73) Assignee: Thule IP AB, Malmo (SE)

( * ) Notice: Subject to any disclaimer, the term of this patent is extended or adjusted under 35 U.S.C. 154(b) by 576 days.

(21) Appl. No.: 12/742,165

(22) PCT Filed: Nov. 12, 2008

(86) PCT No.: PCT/NZ2008/000303
§ 371 (c)(1),
(2), (4) Date: Jul. 28, 2010

(87) PCT Pub. No.: WO2009/064198
PCT Pub. Date: May 22, 2009

(65) Prior Publication Data
US 2010/0327132 A1    Dec. 30, 2010

(30) Foreign Application Priority Data

Nov. 12, 2007  (NZ) ........................ 563350

(51) Int. Cl.
*F16M 11/00*  (2006.01)
*B62J 11/00*  (2006.01)

(52) U.S. Cl.
CPC ...................... *B62J 11/00* (2013.01)
USPC ............. 248/230.8; 248/229.17; 24/269; 254/218

(58) Field of Classification Search
USPC ............ 248/201, 315, 229.17, 230.8, 61; 254/213, 218; 24/305, 68 E, 369, 24/68 CD; 403/97, 93
See application file for complete search history.

(56) References Cited

U.S. PATENT DOCUMENTS

| | | | | |
|---|---|---|---|---|
| 1,978,646 A | * | 10/1934 | Oishei et al. | 248/230.8 |
| 2,604,098 A | | 7/1952 | Kranc | |
| 2,651,484 A | * | 9/1953 | Marchetti | 248/61 |
| 2,998,626 A | * | 9/1961 | Prete, Jr. | 24/170 |
| 3,129,994 A | * | 4/1964 | Harmon et al. | 439/100 |
| 3,290,010 A | * | 12/1966 | Holmes | 24/269 |

(Continued)

FOREIGN PATENT DOCUMENTS

| | | |
|---|---|---|
| DE | 43 04 239 A1 | 8/1994 |
| DE | 203 02 029 U1 | 7/2003 |

(Continued)

OTHER PUBLICATIONS

Official Action with English Translation for Japan Patent Application No. 2010-533032, dated Feb. 2, 2013, 13 pages.

*Primary Examiner* — Terrell McKinnon
*Assistant Examiner* — Daniel Breslin
(74) *Attorney, Agent, or Firm* — Sheridan Ross P.C.

(57) ABSTRACT

An attachment device which includes: a length of material which is fixed to a body portion of the attachment device at one end thereof via a loop, the other end of the length of material being capable, in use, of being passed around a frame or part thereof to which the bracket is to be attached; a gripping mechanism capable of receiving the free end of the length of material and holding the length of material received therein, in a set position, until the gripping mechanism is released; and wherein the looping of the length of material to the body portion positions the length of material between the body portion and the frame or part thereof to which the attachment device is attached in use.

5 Claims, 15 Drawing Sheets

(56) References Cited

U.S. PATENT DOCUMENTS

| | | | |
|---|---|---|---|
| 3,428,331 A * | 2/1969 | Morgan et al. | 410/100 |
| 3,533,588 A * | 10/1970 | Cregier | 248/309.1 |
| 3,704,860 A * | 12/1972 | Krapu | 254/95 |
| 3,826,473 A * | 7/1974 | Huber | 242/388.3 |
| 3,966,154 A * | 6/1976 | Perrault et al. | 248/62 |
| 4,154,382 A | 5/1979 | Blackburn | |
| 4,397,435 A * | 8/1983 | Fisher et al. | 248/61 |
| 4,458,385 A * | 7/1984 | Espinoza | 24/16 PB |
| 4,562,982 A * | 1/1986 | McSherry et al. | 248/61 |
| 4,768,741 A * | 9/1988 | Logsdon | 248/62 |
| 4,813,105 A * | 3/1989 | Espinoza | 24/16 PB |
| 4,900,203 A * | 2/1990 | Pope | 410/36 |
| 4,968,247 A * | 11/1990 | Olson | 432/225 |
| 5,186,586 A * | 2/1993 | Stephenson, Jr. | 410/100 |
| 5,271,540 A | 12/1993 | Katz et al. | |
| 5,282,555 A | 2/1994 | Muir et al. | |
| 5,598,995 A * | 2/1997 | Meuth et al. | 248/74.3 |
| 5,611,520 A * | 3/1997 | Soderstrom | 254/218 |
| 5,653,409 A * | 8/1997 | White et al. | 248/73 |
| 5,941,666 A * | 8/1999 | Waters | 410/100 |
| 6,322,279 B1 | 11/2001 | Yamamoto et al. | |
| 6,350,088 B1 * | 2/2002 | Priester | 410/103 |
| 6,507,980 B2 * | 1/2003 | Bremicker | 24/269 |
| 6,547,218 B2 * | 4/2003 | Landy | 254/217 |
| 6,561,398 B1 * | 5/2003 | Cole et al. | 224/324 |
| 6,609,275 B1 * | 8/2003 | Lin | 24/68 CD |
| 6,641,116 B1 * | 11/2003 | Huang | 254/218 |
| 6,971,826 B2 * | 12/2005 | Valentine | 410/50 |
| 7,100,902 B1 * | 9/2006 | Lu | 254/218 |
| 7,234,617 B2 * | 6/2007 | Weaver et al. | 224/324 |
| 7,278,808 B1 * | 10/2007 | Sisk et al. | 410/156 |
| 8,234,757 B2 * | 8/2012 | Lesley | 24/68 CD |

FOREIGN PATENT DOCUMENTS

| | | |
|---|---|---|
| DE | 20 2004 007 825 U1 | 9/2004 |
| GB | 462138 | 3/1937 |
| JP | S52-21648 | 6/1977 |
| JP | H01-43596 | 12/1989 |
| JP | 2002-252914 | 9/2002 |
| NL | 1009804 | 4/2000 |
| WO | WO 96/20865 | 7/1996 |
| WO | WO 00/43258 | 7/2000 |

* cited by examiner

ATTACHMENTS, BRACKETS, AND SUPPORT ASSEMBLIES

STATEMENT OF CORRESPONDING APPLICATIONS

This application is based on the Provisional specification filed in relation to New Zealand Patent Application Number 563350, the entire contents of which are incorporated herein by reference.

TECHNICAL FIELD

The present invention relates to an improved attachment device, bracket and/or support assembly.

BACKGROUND ART

A multitude of attachment devices, bracket and support assemblies presently exist.

The attachment device, bracket and/or support assembly of the present invention is/are generally suitable for attaching to a frame, or part thereof, such as bicycle frame, automobile roof rack, push chairs or hand rails. However, this should not be seen as limiting as the present invention may be attached to other objects. For ease if reference only the present invention will now be discussed in relation to frames.

A problem with existing attachment devices/brackets such as those shown in U.S. Pat. No. 6,322,279, and U.S. Pat. No. 2,604,098 occurs due to the body of the attachment device/bracket coming into direct contact with the frame, as this can lead to unintended damage, such as paint or surface finish damage, occurring to the framework. This damage typically arises in situations where the attachment device/bracket gets knocked or is otherwise twisted about, or slid along, the frame when the attachment device/bracket encounters a force of sufficient magnitude. The force required to effect damage need normally only be greater than that of the frictional force by which the attachment device/bracket grips the frame.

It would therefore be an advantage if there could be provided an attachment device/bracket which can overcome or at least mitigate the above disadvantages.

In particular, it would be useful if there could be provided an attachment device/bracket which is capable of being subjected to a greater force before moving with respect to the frame.

It would also be of particular advantage if there could be provided an attachment device/bracket which does not have a portion of body of the attachment device/bracket in contact with the frame.

A further drawback of many existing attachment devices/brackets such as disclosed in DE4304239, U.S. Pat. No. 5,282,555 and those previously mentioned, is that their construction limits the maximum size and/or weight of items that the attachment device/bracket is capable of supporting on the frame due to the loading placed on the attachment device/bracket. Heavy items also run the risk of facilitating damage occurring to the frame.

It would be an advantage if there could be an attachment device/bracket which could support a greater load than existing brackets. It would be especially useful if the attachment device/bracket could support larger loads and:
- have a reduced tendency to twist or slide when the attachment device/bracket is subjected to an additional force such as a knock; and/or
- reduce the resultant load exerted by the attachment device/bracket at the point of attachment.

In a similar vein support assemblies used to help secure items to frames, such as bicycle frames, also suffer from a number of drawbacks.

For ease of reference the frame will now be referred to as a bicycle frame. However, it will be appreciated that this should not be seen as limiting as the bracket and/or support assembly of the present invention may be used with other frames.

One drawback with known support assemblies such as those disclosed in U.S. Pat. No. 5,271,540, U.S. Pat. No. 4,154,382 and NL1009804C, used for carrying luggage, or other items, is that they are generally only capable of being used on one particular type and/or size of bike. That is the support assemblies tend to be manufactured to a set size and to have specific points of attachment on the bicycle.

Another drawback with known support assemblies is that they tend to have one, or in some cases two, position(s) in which they can be employed on a bicycle.

It would therefore be useful if there could be provided a support assembly which can be more universally fitted to different types and/or sizes of bicycle.

In particular it would be useful if an adjustable support assembly could be provided to cater for the wide range of bicycle frame configurations available.

A further draw back of other known support assemblies such as those disclosed in DE202004007825U, GB462138 and WO0043258 is that they are generally fixed or attached to the bicycle using bolts, clamps and other permanent fasteners, taking some time and difficulty to attach or detach.

It would therefore be useful if there could be provided a support assembly that could be attached and/or detached with ease, using a less permanent fastening system, that would take less time to attach and detach.

It would also be useful if a support assembly could be provided which has sufficient strength and/or versatility to allow the support assembly to be used for more than just carrying luggage or other items.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

Attachment Device

According to one aspect of the present invention there is provided an attachment device which includes:
- a length of material which is fixed to a body portion of the attachment device at one end thereof, the other end (free end) of the length of material being capable, in use, of being passed around the object or part thereof to which the attachment device is to be attached; and
- a gripping mechanism capable of receiving the free end of the length of material and holding the length of material received therein, in a set position, until the gripping mechanism is released.

According to a further aspect of the present invention there is provided an attachment device substantially as described above wherein the gripping mechanism includes:
- a pawl and spring arrangement;
- a toothed spindle which includes a slot for receiving the free end of the length of material;

wherein the pawl is biased by the spring to engage the teeth on the spindle, the teeth being shaped to only allow for rotation of the spindle in one direction when engaged by the biased pawl to allow for tensioning of the length of material. The pawl and spring arrangement being configured to allow for the pawl to be moved to disengage the teeth so the spindle is capable of rotation in both directions.

In general, the pawl maybe disengaged via a release apparatus.

In one preferred embodiment the release apparatus may be in the form of a cylindrical rod having an eccentric cam protrusion. The eccentric cam protrusion may be positioned to engage beneath a shoulder portion of the pawl. When the cylindrical rod is rotated the eccentric cam protrusion lifts the pawl via the shoulder portion causing it to release its interaction with the toothed portion of the spindle and thereby allowing the spindle to rotate freely.

In some embodiments the cylindrical rod may be in the form of a separate key including an eccentric cam at one end, that may be inserted into the body portion and rotated to disengage the pawl substantially as described above.

In one further preferred embodiment, the cylindrical rod having an eccentric cam that can interact with the pawl, wherein the cylindrical rod may be retained within the body portion, and wherein the cylindrical rod has a suitably shaped aperture or protrusion available to be engaged by a suitably shaped tool, (such as a hexagon key), to allow for rotation thereof. Thereby facilitating the withdrawal of the pawl, from engagement with the toothed section of the spindle.

In yet further embodiments the pawl may itself be a resilient element (i.e. resilient pawl) which is normally biased to engage the teeth of the spindle, but is configured so that it can be moved to a disengaged position to allow for free rotation of the spindle.

In yet a further embodiment, a spring activated rotary pawl is used, which pivots about a retention pin. The pawl again is configured to also be capable of being moved to an disengaged position.

The rotary pawl or resilient pawl may be disengaged from the toothed spindle, in a number of different ways.

In one preferred embodiment, the pawl has a suitably shaped aperture or protrusion which can be engaged by a suitably shaped tool, such as a hexagon key, to rotate the pawl against the spring tension, thus dis-engaging it from the toothed spindle.

According to a further aspect of the present invention there is provided an attachment device including:
- a ratchet having a toothed spindle and pawl;
- a length of material in the form of a strap connected to a body portion, the strap connected to the body portion via means of a loop, the free end of the strap, in use, passing through a slot in the toothed spindle.

In preferred embodiments the looping of the strap positions the length of material between the body portion and the frame or object to which the attachment device is attached in use.

In preferred embodiments the attachment device may have adapted a region of the body portion to allow for attachment of items thereto which are to be supported by the attachment device. For example, the region may include one or more apertures therein via which an item can be attached to the attachment device. Alternatively, it may have one or more protrusions configured to engage apertures, grooves, sockets or the like on the object to be attached thereto.

According to yet a further aspect of the present invention there is provided an attachment device substantially described above wherein a section of cushioning material is attached to, formed with, or positioned upon, either: the length of material, or the body portion to prevent at least a portion of the body portion from directly contacting the object or part thereof.

Further aspects of the attachment device will be discussed below in relation to the bracket assembly of the present invention which employs the attachment device of the present invention.

Bracket Assembly

According to one aspect of the present invention there is provided a bracket assembly which includes:
- two attachment devices;

characterised in that the two attachment devices are connected via at least one member so as to be spaced apart from one another;

and wherein the each attachment device includes:
- a length of material which is fixed to a body portion of the attachment device at one end thereof, the other end (free end) of the length of material being capable, in use, of being passed around the object or part thereof to which the bracket assembly is to be attached; and
- a gripping mechanism capable of receiving the free end of the length of material and holding the length of material received therein, in a set position, until the gripping mechanism is released.

According to another aspect of the present invention there is provided a bracket assembly substantially as described above wherein the length of material is attached to the body portion of the attachment device, in a manner that positions the length of material between, the body portion and the object to which it is attached in use.

According to a further aspect of the present invention there is provided a bracket assembly substantially described above wherein the length of material and/or bracket are individually, or collectively, configured to prevent at least a portion of the body portion from directly contacting the object.

According to yet a further aspect of the present invention there is provided a bracket assembly substantially described above wherein a section of cushioning material is attached to, formed with, or positioned upon either: the length of material, or the body portion of the bracket, to prevent at least a portion of the body portion from directly contacting the object or part thereof.

In general, the object to which the attachment device may be attached will be a frame. However, this should not be seen as limiting.

For ease of reference, the object will now be referred to as being a frame.

The cushioning material may be any material which will have the effect of preventing or minimising the risk of the bracket damaging the frame (or part thereof) to which it is attached.

Preferably, the cushioning material may be foam rubber, soft plastic, composite fabric, elastomers or such like. However, other cushioning materials are envisaged to this list should not be seen as limiting.

It is envisaged that the member by which the two attachment devices are connected may come in a variety of different forms without departing from the scope of the present invention.

In general the member may be substantially elongate in nature.

In preferred embodiments the member may be in the form of at least one bar, tube, or such like.

In other embodiments the member may be in the form of a substantially elongate sheet of material.

In other embodiments the member may be formed to have different shapes or configurations.

In general, the member will have at least one longitudinal axis which substantially corresponds to that of the frame to which the bracket is to be attached.

The length of material may come in a variety of different forms without departing from the scope of the present invention.

In general, the length of material may be in the form of a strap or such like.

In preferred embodiments the length of material may be in the form of a webbing or such like.

In preferred embodiments the length of material may be flexible, or at least partially flexible, in nature.

The length of material may be fixed to the body portion in number of different ways.

In preferred embodiments the length of material may be fixed to the body portion of the attachment device via a loop.

The loop may be formed in a variety of different ways.

In some embodiments, the loop may be formed and secured by stitching one free end of the length of material to a portion of the length of material intermediate to the two free ends.

In preferred embodiments the length of material may be passed around/through the body portion and the loop may be formed in combination with a section of cushioning material.

In one preferred embodiment, the loop may be formed in combination with a section of cushioning material which has one or more slots through which the length of material can be passed, and through which the free end of the length of material, can be passed back on itself, whilst securing the length of material to the body portion Alternatively, the loop may be formed simply by passing an end of the length of material through the body portion and then threading the free end back on itself.

In such non-stitched embodiments, the length of material may be positioned between the body portion and the object to which the attachment device or bracket is attached, such that the force applied to the loop section by the object and the body portion, when the length of material is tightened, holds the loop in place.

Furthermore, in such non-stitched embodiments described, the configuration of the length of material being looped through the body portion and back on itself, allows the tightening force to restrain the length of material from slipping, through being positioned between the body portion and the object.

In some other embodiments the length of material may have one end thereof constructed to be of larger dimensions (e.g. thickness), than that of the remainder length of material. This enlarged end construction of the length of material thereby allowing for this end to be retained within the body portion of the attachment device, whilst the remainder of the length of material extends out therefrom.

It is envisaged in further embodiments the length of material may be formed integrally with the body portion.

In preferred embodiments the member may be adapted to allow for attachment of items thereto which will be supported by the bracket. For example, the member may include one or more apertures therein via which an item can be attached to the bracket. Alternatively, it may have one or more shaped protrusions configured to engage apertures, grooves, sockets or the like on the item to be attached thereto.

The item may be nearly anything which one wants to attach to a frame via a bracket.

Preferably, the item may be a support frame such as, for example only, is detailed later on in this specification. Although it can be appreciated that other items can be equally attached to the bracket.

In some cases the item itself may clamp or otherwise directly engage the member so as to effect an attachment to the bracket.

As can be discerned from the above description the body portion and/or member may come in a variety of different configurations without departing from the scope of the present invention.

The body portion houses the gripping mechanism and may be integrally formed as part of the elongate member or attached thereto.

In one preferred embodiment the body portion may be substantially U-shaped when viewed side on. The upper end of the arms of the U being the point where the body portion is attached to the member. A length of material can then be passed through the aperture created by the base of the U-shape and a loop arrangement created to secure the length of material to the body portion.

In other preferred embodiments where the body portion is integrally formed as part of the member the body portion may include a slot or other aperture therein through the length of material can pass to facilitate its attachment to the body portion.

Ideally, the body portion is also configured to have a shape which substantially corresponds to that of the frame to which the bracket will be attached.

The frame may be any structure to which it is desired to attach a bracket by means of a length of material which can be passed around a portion of the frame.

In preferred embodiments the frame may be in the form of a bicycle frame, or a roof rack frame.

In preferred embodiments, where the frame is in the form of a frame for a bike, the body portion may include a curved surface which corresponds to that of the portion of the frame to which the bracket will be attached. The curved surface generally corresponds to that of the frame, receiving and positioning it positively to the base of the two parallel U-sections, contacting the frame through the looped and doubled back length of material.

It is through the base of the two U-shaped sections of the body portion, about which the length of material is looped though and doubled back, that tightening the strap provides the necessary pressure point contact through the length of material, and against the frame, securing the length of material and preventing it from slipping in use.

In preferred embodiments the width and/or thickness of the length of material may be sufficient to prevent the body portion from contacting the frame.

In some particular embodiments it may be necessary to add a section of cushioning material to increase the total thickness and for width of the length of material to ensure the body portion does not contact the particular frame.

The gripping mechanism may come in a variety of different forms without departing from the scope of the present invention.

In some preferred embodiments the gripping mechanism may be in the form of a ratchet and pawl arrangement, wherein the free end of the strap passes through a slot in a spindle associated with the ratchet.

In some other preferred embodiments the gripping device may be in the form of a worm and tooth wheel arrangement to effect the rotation of the spindle and the subsequent tensioning and holding of the length of material being held within the slot in the spindle.

In some other embodiments the gripping device may be in the form of a clamp or such like which can be closed to the grip the length of material.

In further embodiments the gripping device may be in the form of a pinion rotating with meshed contact against a toothed or racked length of material.

Support Frame

According to one further aspect of the present invention there is provided a support frame which includes:
 a primary support member;
 at least one secondary support member;
characterised in that the primary and secondary support members are connected to one another in a manner which allows the relative spatial relationship of the two members to be adjusted and wherein at least one end of each member, is capable in use, of connecting the support frame to an article.

In this aspect the end(s) of member(s) may directly or indirectly interact with at least one connection point on the article wherein the connection point is adapted to engage, or facilitate engagement with, the member(s).

According to a further aspect of the present invention there is provided a support frame which includes:
 a primary support member;
 at least one secondary support member;
characterised in that the primary and secondary support members are connected to one another in a manner which allows the relative spatial relationship of the two members to be adjusted and wherein at least one end of each member is adapted to be capable of connecting the support frame to an article.

A support frame substantially as described above wherein the ends of the primary and/or secondary support member, are used to connect the member to an article, include an attachment portion.

A support frame substantially as described above wherein the attachment portion is attached to the member in a manner that allows the attachment portion to at least partially pivot or swivel with respect to said member.

The article may be nearly anything to which one may want to attach a support frame to.

The support frame may be used to either support items directly thereon or indirectly via a support surface or other support-device which is attached thereto.

Alternately, the support frame may be used to effect a connection between an item and the article. For example if the item may be a wheeled cart which is connected to a bicycle via a support frame.

In general the second member has the function of a strut to assist and stabilise the primary member in carrying the load created by the items being supported.

Preferably, the member/s of the support frame may be capable of being pivotally attached to the article either directly or via an attachment portion.

In preferred embodiments the article may be a bracket or the like.

In preferred embodiments, the article may be a bracket assembly substantially as described above, however this should not be seen as limiting.

In other embodiments the article may be a portion of a bicycle frame or bicycle fork member.

In further embodiments, the article may be, a portion of a bicycle frame or bicycle fork member, that has connection points which may include one or more apertures and/or protrusions that are capable of engaging the primary and/or secondary support members of the support frame, to attach them directly or indirectly to the frame or fork member.

It is envisaged that the primary support member may come in a variety of different forms without departing from the scope of the present invention.

In preferred embodiments the primary support member may be substantially U-shaped when viewed from above/below, or front/end on.

In other embodiments of the present invention, a straight, (non-U-shaped) primary support member may be used in conjunction with a secondary support member and be attached to an article, either directly or via a bracket.

In some further preferred embodiments the primary support member may be configured to have a first section and a second section which are angled with respect to one another.

In preferred embodiments, the first section may be substantially at right angles to the second section.

In other embodiments the first section may be at a substantially obtuse or oblique angle to the second section of the primary support member.

In some embodiments the primary support member may include a series of apertures, shaped protrusions, or fixing points spaced along a region of its length to allow for connection to the secondary support member.

The secondary support member may have a variety of different configurations without departing from the scope of the present invention.

In some preferred embodiments the secondary support member may be in the form of a rod which has two hooked or suitably shaped ends which can engage with apertures or shaped protrusions in the primary support member, and/or to apertures or shaped protrusions on the article to which the support frame is to be attached.

In a preferred embodiment of the above described secondary support member embodiment, the secondary support may indirectly connect to the primary support member by means of a clamp or such like. In this embodiment, the said clamp, when released, may be allowed to slide on the first and/or second member of the primary support member to allow for a range of adjustable positions for the secondary support member to be attached and locked in position.

In some further preferred embodiments the secondary support member may be adapted to allow for the length of the secondary member to be adjusted.

In some such embodiments the secondary support member may include two or more telescopic sections.

In some other embodiments that allow the secondary member to have its length adjusted, the secondary support member may include two or more sections that are slidably linked together.

It is of course envisaged that secondary support member may also be capable of adjusting its length in a variety of other ways, such as may be known in the art, without departing from the scope of the present invention.

In general, the primary and secondary support members may be pivotally connected to one another.

The ends of the primary and/or secondary support members may be capable of being attached to an article in a variety of different ways.

In some embodiments where the primary and secondary support members are substantially tubular in nature, a connection to the article may be effected via interaction with a suitably shaped and dimensioned protrusion, which is received within the tubular member.

In some further preferred embodiments, the ends of each member used to connect the support assembly to an object may include an aperture (or clevis) which can receive an attachment device such as a pin, bolt or such like.

In some further preferred embodiments, in addition to an aperture, the ends of the member may include a slot, groove or clevis to facilitate attachment to the article.

Alternately, the ends of the member may have a bulbous end which can engage with a socket to form a ball joint.

Further the ends of the members may have a connection which facilitates quick mechanical attachment and release to the article. Such quick-release mechanism may incorporate over-centre cam locking devices such that are known in the art, or may use other quick-release methods of connection, without departing from the scope of the present invention.

It is envisaged the attachment portion may come in a variety of different forms.

In preferred embodiments the attachment portion may include:
- a first aperture which is at one end of the attachment portion and which is transverse with respect to the longitudinal axis of the attachment portion; and
- a slot which runs co-axial with the longitudinal axis of the attachment portion; and
- a second aperture at the other end of the attachment portion which is also transverse to the longitudinal axis of the attachment portion as well as being orthogonal with respect to the axis of the first aperture.

In such embodiments the section of the attachment portion through which the second aperture passes may be suitably shaped/dimensioned so as to fit within, or fit over, the end of the primary support member which includes an aperture, which can align with the second aperture in the attachment portion, to allow for connection via an attachment device such as a bolt, pin or such like.

The attachment portion and associated member may be adapted to at least partially pivot or swivel with respect to one another in a variety of different ways.

In a preferred embodiment the aperture(s) which connect(s) the attachment portion to the primary support member may be shaped/dimensioned to allow for substantially horizontal movement of the attachment device portion to allow for at least some angular adjustment of the attachment portion.

Alternately, the ends of the attachment portion may have a bulbous end which can engage with a socket to form a ball joint to facilitate swivelling and angular adjustment.

Further the ends of the attachment portion may have a connection which facilitates such swivelling and angular adjustments described above, as well as allowing quick mechanical attachment and release to the article. Such quick-release mechanism may incorporate over-centre cam locking devices such that are known in the art, or may use other quick-release methods of connection, without departing from the scope of the present invention.

In some preferred embodiments the support frame may include a deck, or generally horizontal surface for supporting items thereon.

In other preferred embodiments the support frame may include apertures and/or shaped protrusions to attach further receptacles and/or support-devices for supporting items thereon. For example, such receptacles/support-devices could receive, support and/or retain: panniers, bags, baby-seats, baskets; but should not be limited thereto.

In some preferred embodiments the support frame may include a retention arrangement for retaining items on the deck or on the frame.

In one preferred embodiment the retention arrangement may be in the form of a bungee and hook device that is housed inside the primary support member. In use the bungee and hook device may be withdrawn from the primary support member and stretched over items to be secured to the support frame, deck or other support means employed. When released and relaxed, the bungee retreats back inside the tubular primary support member of the support frame, leaving the hook device exposed for useful access.

In some embodiments the retention arrangement may be in the form of a biased clamp type arrangement which can be opened and then closed on the item being carried by the deck.

In other preferred embodiments the retention arrangement may use the support frame, and/or an attached deck and/or other related shaped protrusions or apertures, to receive and retain items that are shaped/dimensioned to match and/or engage such apertures and shaped protrusions.

Support Assembly

According to another aspect of the present invention there is provided a support assembly which includes a support frame which has:
- a primary support member;
- at least one secondary support member;

characterised in that the primary and secondary support members are connected to one another in a manner which allows the relative spatial relationship of the two members to be adjusted and wherein at least one end of each member, is capable in use, of connecting the support frame to an article via at least one attachment device or at least one bracket.

Accordingly to another aspect of the present invention there is provided a support assembly which includes a support frame substantially as described above wherein at least one end of each member: is connected to at least one:
- attachment device; or
- bracket; and/or wherein at least one end of each member is adapted to be connected to at least one connection point;

wherein the attachment device and bracket are substantially as described above.

According to a further aspect of the present invention there is provided a support assembly which includes:
- a support frame which includes:
  - a primary support member; and
  - a secondary support member;
- wherein the primary and secondary support members are
  - connected to one another in a manner which allows the relative spatial relationship of the two members to be adjusted; and
- a bracket which includes:
  - two attachment devices;
- wherein the attachment devices are connected to one another via at least one member so as to be spaced apart from one another.

According to a further aspect of the present invention there is provided a support assembly substantially as described above wherein each attachment device includes:

a length of material which is fixed to a body portion of the attachment device at one end thereof, the other end (free end) of the length of material being capable, in use, of being passed around the object to which the bracket is to be attached; and a gripping mechanism capable of receiving the free end of the length of material and holding the length of material received therein, in a set position, until the gripping mechanism is released.

According to another aspect of the present invention there is provided a support assembly substantially as described above wherein the length of material and/or the bracket are individually or collectively configured to prevent at least a portion of the body portion from directly contacting the article.

The article may be nearly anything to which one may want to attach a support assembly in order to carry items via a support assembly.

In preferred embodiments the article may be the frame of a bicycle or such like.

According to a further aspect of the present invention there is provided a support assembly substantially as described above wherein the ends of either the primary or secondary support member, used to connect the member to an attachment device or bracket, include an attachment portion.

According to another aspect of the present invention there is provided a support assembly substantially as described above wherein the attachment portion is attached to the primary or secondary member in a manner that allows the attachment portion to at least partially pivot or swivel with respect to said member.

According to another aspect of the present invention there is provided a deck or generally horizontal surface capable of supporting items thereon.

According to yet another aspect of the present invention there is provided a support assembly substantially described above wherein there is provided apertures and/or suitably shaped protrusions to attach receptacles and/or support-devices for supporting items thereon. For example, such receptacles/support-devices could include: panniers, bags, baby-seats, baskets; but should not be limited thereto.

According to yet another aspect of the present invention there is provided a support assembly substantially described above that includes a bungee and hook device, that is housed inside the primary support member or a portion thereof.

Thus, preferred embodiments of the present invention may have a number of advantages over the prior art which can include one or more of the following:

an attachment device and/or bracket which is configured to minimise the chance of the bracket damaging an object to which it is attached;

an attachment device and/or bracket which is capable of supporting a larger load;

an attachment device and/or bracket having a reduced tendency to twist or slide when the bracket is subjected to additional force such as a knock; and/or an attachment device and/or bracket capable of reducing the resultant load exerted by the attachment device and/or bracket at the point of attachment;

an attachment device and/or bracket capable of being used for multiple attachment purposes;

an attachment device and/or bracket which is capable of being attached and detached quickly and with ease;

an attachment device and/or bracket which is capable of being attached securely to a range of different frames, and frame sections.

an attachment device and/or bracket which is capable of applying a greater gripping force (throughout 360 degrees of the frame profile being attached to);

a support frame which is capable of being used on different types of bicycles;

a support frame which is capable of being used on different sized bicycles;

a support frame which is capable of being attached to a bicycle in two or more positions;

a support frame which is capable of being attached and detached to a bicycle quickly and with ease;

a support frame which is capable of being adjusted quickly and with ease, to fit a wide variety of bicycle types and sizes;

a support frame which is capable of including a means of attaching and interchanging further receptacles/support-devices for supporting items.

a support frame which is capable of including a means of retaining and securing items to the deck or other support-device.

a support assembly for carrying luggage on a bicycle which has one or more of the above advantages described in relation to attachment devices, brackets and/or support frames, above.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
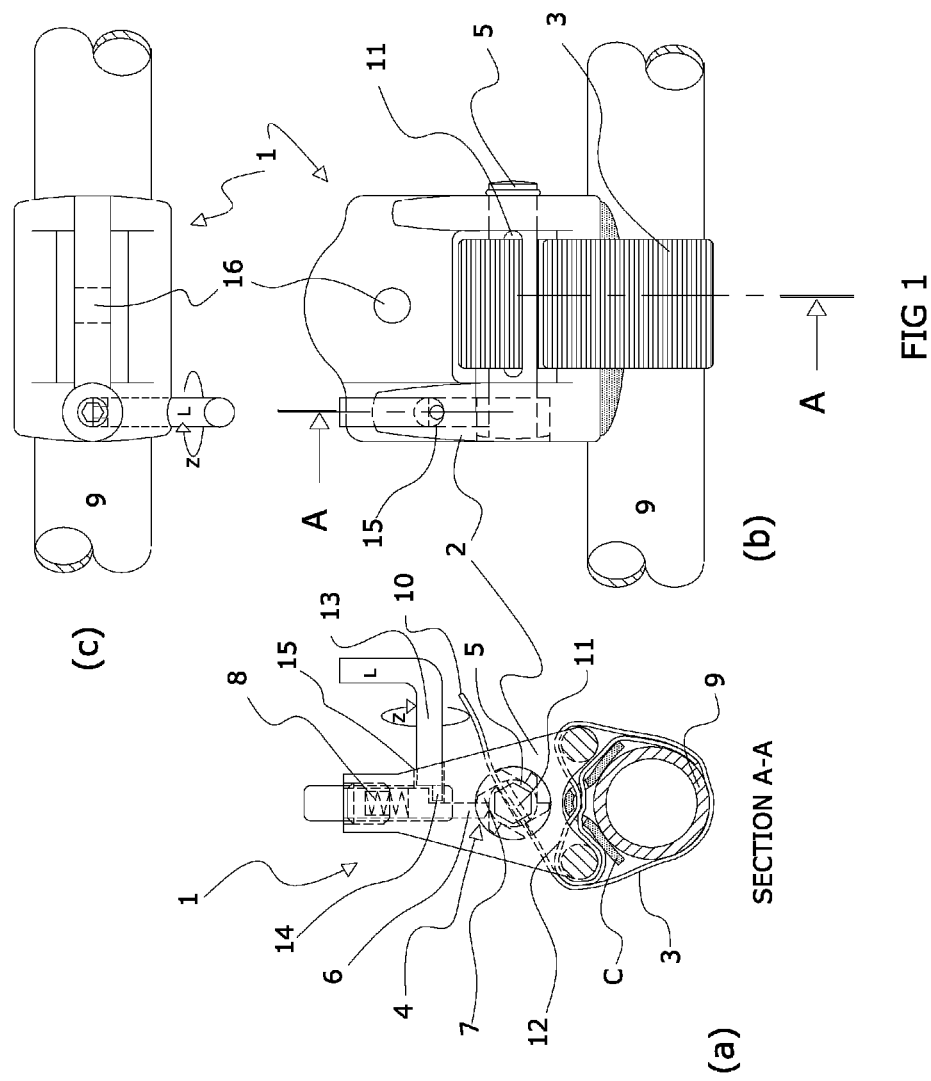
FIG. 1 is (a) a cross sectional end view A-A, of one preferred embodiment of the attachment device in accordance with the present invention; (b) a side view of the attachment device in (a); (c) a top view of the attachment device in (b)

With respect to FIG. 1 there is provided an attachment device (1) which has a body portion (2) and length of material in the form of a strap (3) and a gripping mechanism in the form of a ratchet (4). The ratchet (4) has a toothed spindle (5) and a pawl (6). The pawl (6) is biased towards the teeth (7) on the spindle (5) by means of a spring (8).

The strap (3) encircles an object (9) and the free end (10) of the strap (3) passes through a slot (11) in the spindle (5). The strap (3) is connected to the body portion (2) via a loop (12) which is formed via one end of the strap (3) being passed back on itself and being positioned between the body portion (2) and the object (9). A section of cushioning material (C) is shown positioned between the looped strap (3) and the object (9). The pawl can be disengaged from the toothed spindle by means of a release apparatus in the form of a key (L) having an eccentric cam (14) which can be located in an aperture (15) of the body portion (2). The rod (13) can be rotated by a key (L) so that the cam (14) lifts the pawl (6) to disengage contact with the teeth (7).

The body portion (2) has a region adapted for attaching items thereto in the form of an aperture (16). In use, items can be bolted to the body portion (2) via aperture (16). Alternately, in embodiments where the aperture is threaded items may be screwed to the body portion (2).

Figure 2:
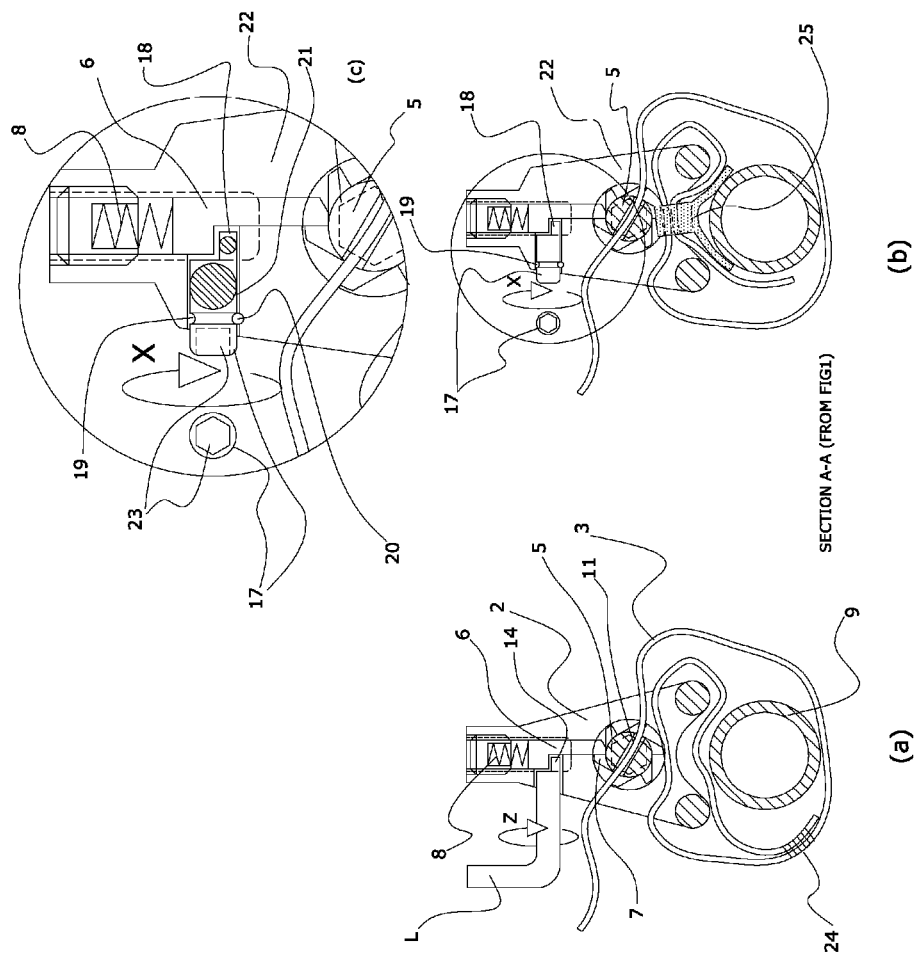
FIG. 2 (a) shows a cross sectional view of a further embodiment of the attachment device in accordance with the present invention; (b) shows a cross sectional view of an alternative release mechanism for the attachment device; (c) shows an enlarged portion of view (b) to provide further detail of the alternative release mechanism.

As shown in FIG. 2, the toothed end (7) of the ratchet spindle (5) engages with a pawl (6).

The pawl (6) is biased towards the teeth of the spindle by means of a spring (8). In use, when the toothed spindle (5) is rotated in an anti-clockwise direction, this allows the pawl (6) to permit the toothed spindle to rotate so as to tension the strap (3) against the object (9) about which the strap encircles. The pawl (6) does not allow the toothed spindle (8) to rotate in a clockwise direction to maintain the tension on the strap (3).

Conversely, as shown in FIG. 2 (a), when the pawl (6) is disengaged, by rotating a release apparatus in the form of a key (L) in the direction shown by arrow Z, so that a cam (14) lifts the pawl (6) out of engagement with the toothed spindle (5), the toothed spindle (5) can be rotated clockwise to release the tension on strap (3) which can then, if required, be pulled out of slot (11) in the spindle (5).

The teeth of the toothed spindle (5) are configured to allow the spindle (5) to be moved in an anti-clockwise direction when sufficient rotational force is applied to the spindle to overcome the resistance of the spring biased pawl (6). In use, sufficient rotational force may be applied to the spindle (5) by means of a screw driver, hexagon key or such like which can engage a suitably shaped indent (not shown) in the end of the toothed spindle (5).

FIGS. 2(b) and (c) show an alternative embodiment of that in FIG. 2(a) with the key difference relating to the release apparatus which in this embodiment is in the form of a cylindrical rod (17) having an eccentric cam (18). The cylindrical rod (17) has an annular groove (19) which receives a pin (20) which holds the rod (17) in the aperture (21) in the body portion (22). The cylindrical rod (17) has an aperture in the form of a hexagonal recess (23) which can received an alien key (not shown) which can be used to rotate the cylindrical rod (17) in direction (X) to disengage the pawl (6) from the toothed spindle (5).

Figure 3:
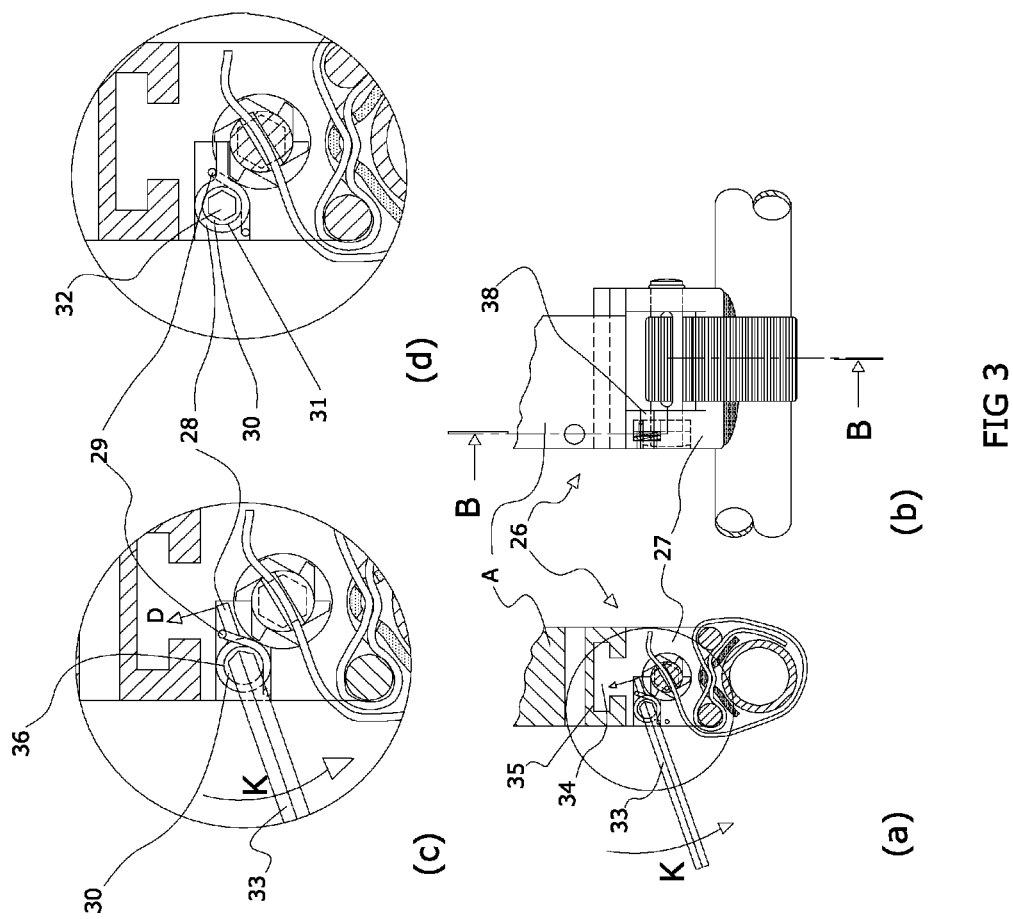
FIG. 3 (a) shows a cross sectional view (B-B) of an alternative ratchet arrangement; (b) is a side view of the alternative ratchet arrangement shown in (a): View (c) and (d) show enlarged partial sectional views of the alternative ratchet arrangement shown in (a)

FIG. 3 (a) and (b) shows an alternate embodiment of an attachment device (26) in accordance with the present invention. FIG. 3(c) and (d) show a portion of the alternate embodiment in enlarged detail. The key differences this embodiment has to previously described embodiments are the body (27) has a protrusion which has a T-shaped cross section (34) to allow for sliding engagement of items (A) (of which only a small portion is shown) to the body portion (27) via means of a groove (35) on the article corresponding to the T-shaped cross section of the body portion (27). This embodiment also has a pawl (28) activated by a sprung element (29) also shown in FIG. 5. A release apparatus in the form of a stepped cylinder (30) frictionally engages the inner circumferential surface (36) of the sprung element (29). The stepped cylinder (30) has an engaging surface (31)—refer FIG. 5—which mechanically engages the inner circumferential surface (37) of the pawl (28)—refer FIG. 5—and a hexagonal recess (32) which can engage an alien key (33). The cylinder (30) also has an axle (38)—refer FIG. 5—at the opposite end to recess (32) which fits into an aperture (not shown) in the body portion (27). The cylinder (30) in use can rotate about axle (38) when moved by the alien key (33). To disengage the sprung activated pawl (28) the alien key is rotated in the direction of arrow (K) which moves the sprung pawl as shown by arrow (D) against its natural bias (due to its positioning and configuration) to engage the teeth.

Figure 4:
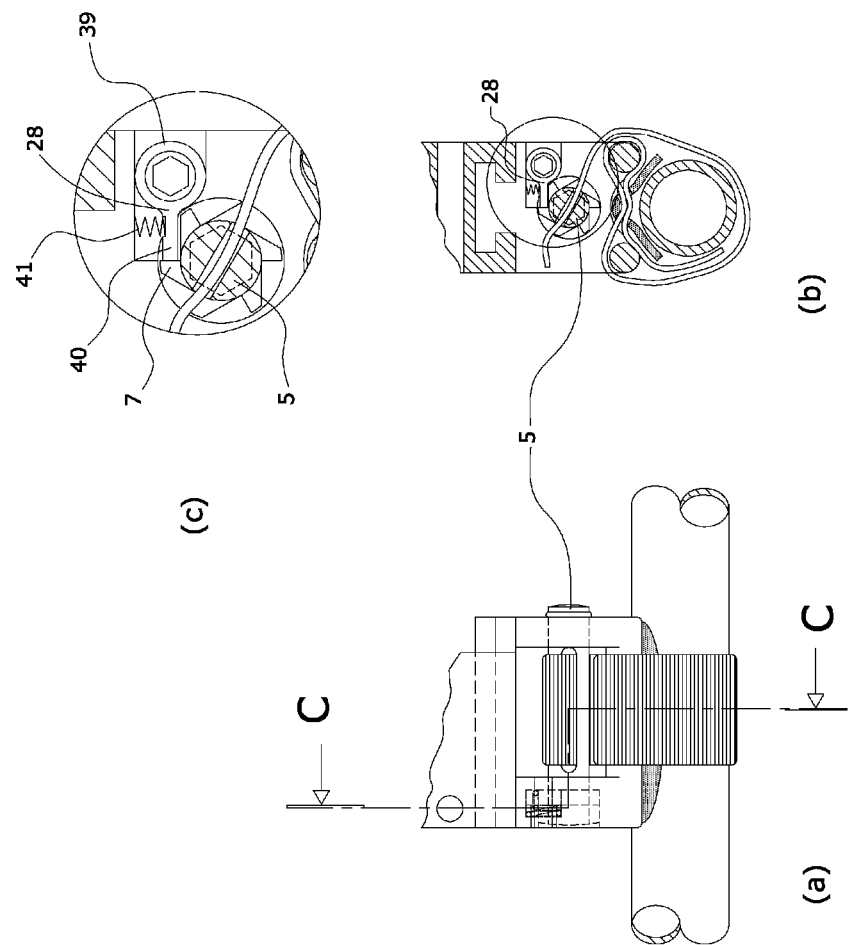
FIG. 4 shows a further embodiment of the attachment device, with an alternative sprung pawl arrangement.

FIG. 4 shows a pawl (28) having a ring portion (39) with a protrusion (40). The protrusion (40) engages the teeth (7) on the toothed spindle (5). The protrusion (40) is biased towards the teeth (7) by a spring (41). Again, this embodiment uses a stepped cylinder substantially as described in relation to FIG. 3 to disengage the pawl (28) from the toothed spindle (5).

Figure 5:
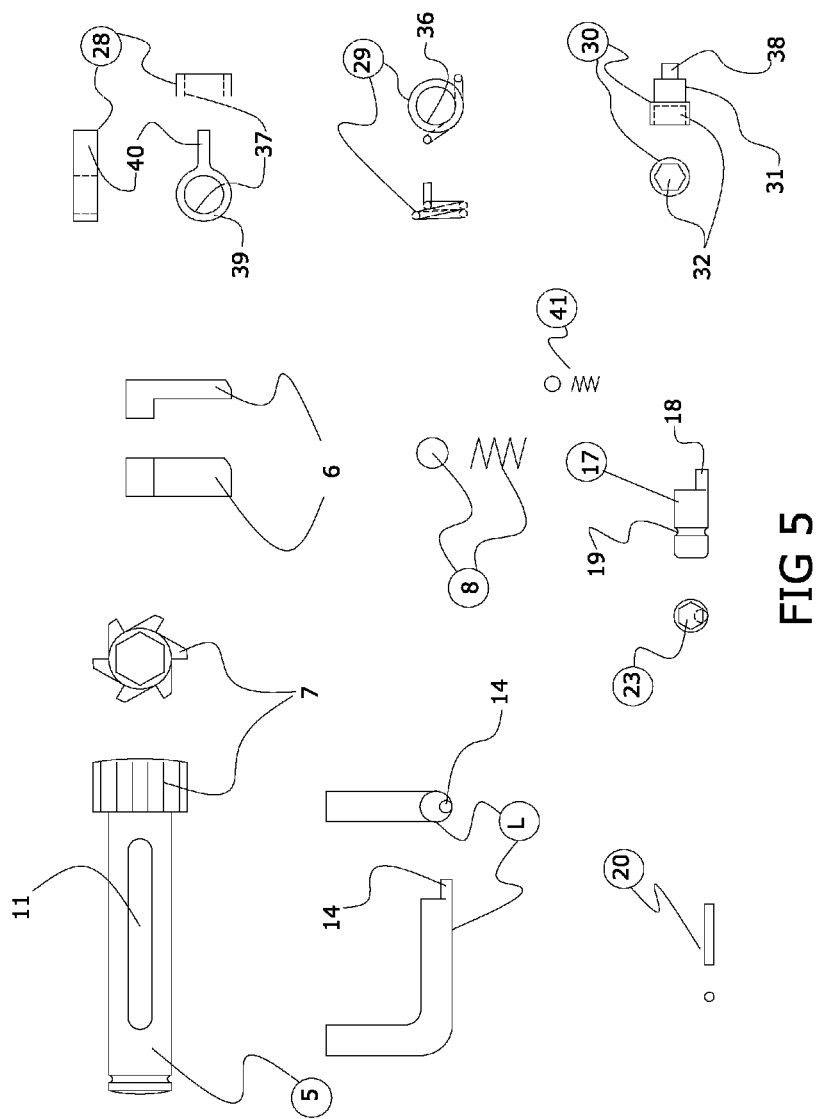
FIG. 5 is a detailed schematic of components shown in FIGS. 1,2,3,4, and 7.

FIG. 5 shows the components in FIGS. 1, 2, 3, 4 and 7 in more detail. In particular the spindle (5), slot (11) and teeth (7). Additionally, shown are the pawl (6), the key (L), both inside and front elevations; and the spring (8), in top and side elevations. Also shown is an alternative pawl (28), that works in conjunction with sprung element (29) and the stepped cylinder (30). Also shown in FIG. 5 is a side and end elevation of an alternative release apparatus in the form of a cylindrical rod (17) and the corresponding retaining pin (20).

Figure 6:
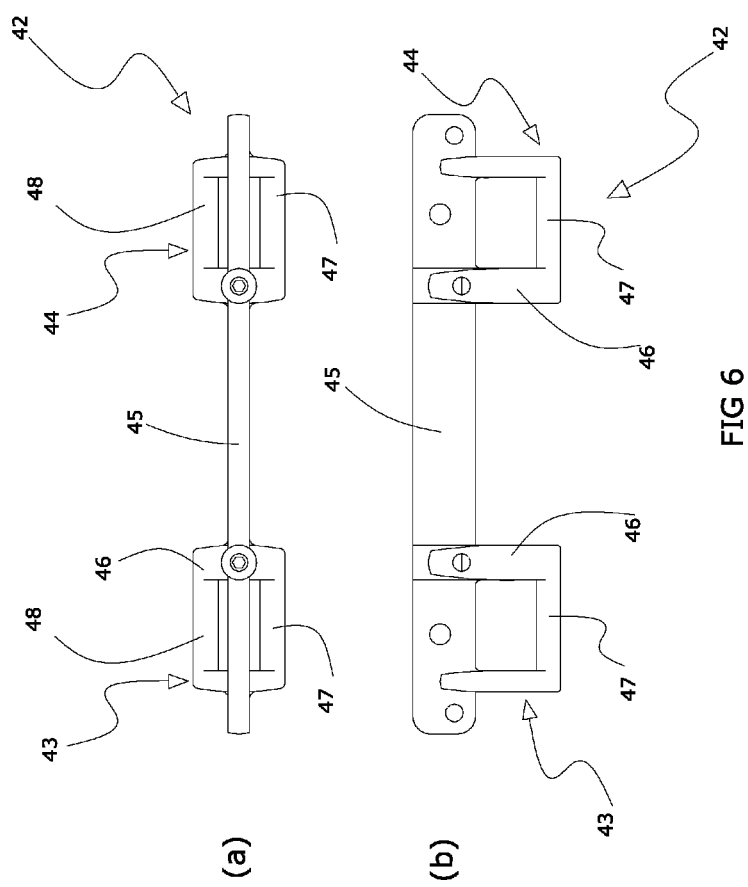
FIG. 6 is (a) a schematic top plan; and (b) a side view of a bracket in accordance with one preferred embodiment of the present invention.
Figure 7:
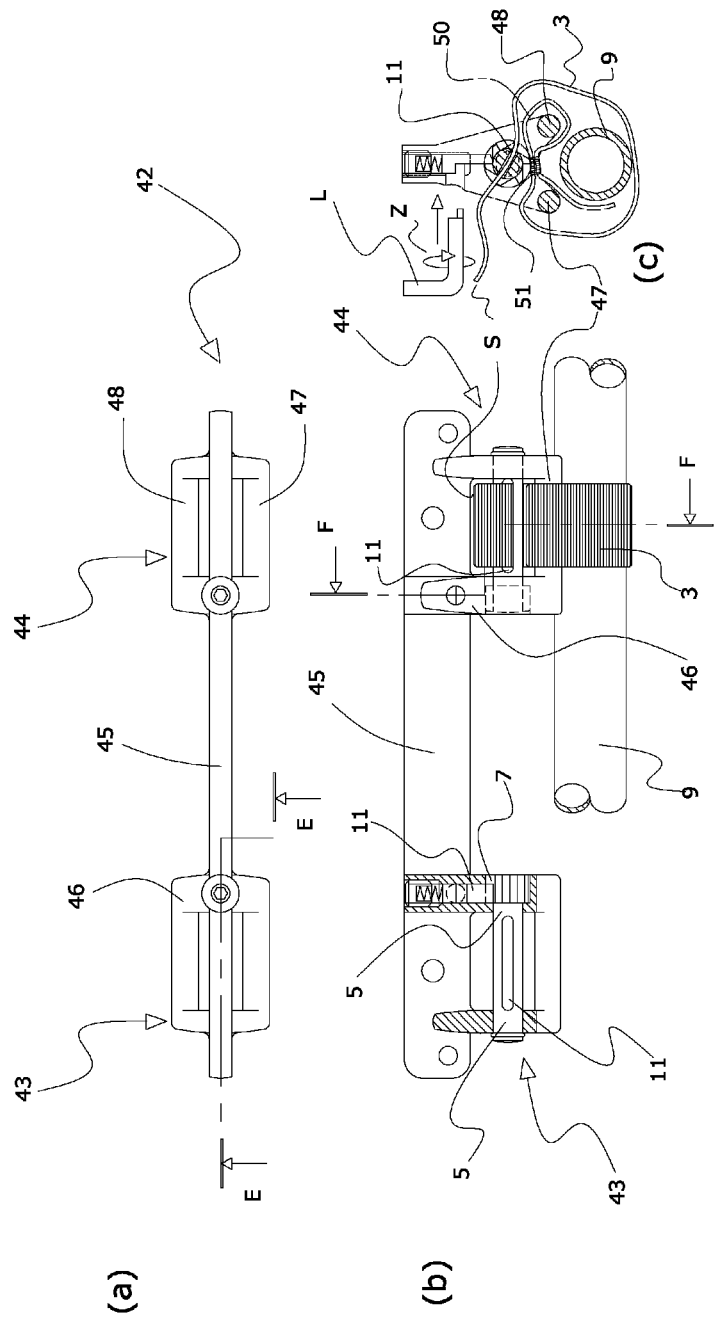
FIG. 7 is (a) a schematic top plan, (b) side elevation including a part section view through broken line E-E (c) sectional end view through broken line F-F, of the bracket shown in FIG. 5.

With respect to FIGS. 6-7 there is shown a bracket (42) which has two attachment devices (43) and (44) which are connected via a member in the form of a bar (45). In FIG. 6 the attachment devices (43) and (44) do not show the gripping mechanism in order to more clearly show the body portion (46).

The attachment devices (43) and (44) are shown in more detail in FIGS. 7 and 5. The attachment device (44) has a length of material in the form of a strap (3) which is connected to a body portion (46) which is substantially U-shaped when viewed side on (refer FIG. 6(b)). The strap (3) is connected to the body portion (46) via means of a loop (50). The loop (50)

is formed via stitching 51 which joins one end of the strap (3) to another part of the strap. As can be seen in FIGS. 6 and 7 the body portion has two U-shaped members (47) and (48) on either side of bar (45). It is about, the U-shaped members (47) and (48), that the loop (50) is formed—refer FIG. 7.

FIG. 2 (a) shows one configuration of the looped strap attachment. FIG. 2 (b) shows an alternative configuration of the looped strap connection. FIG. 4 and FIG. 7(c) show further alternative configurations of the looped strap attachment.

With respect to FIG. 7 the free end (S) of the strap (3) in use passes through a slot (11) in a ratchet spindle (5).

Figure 8:
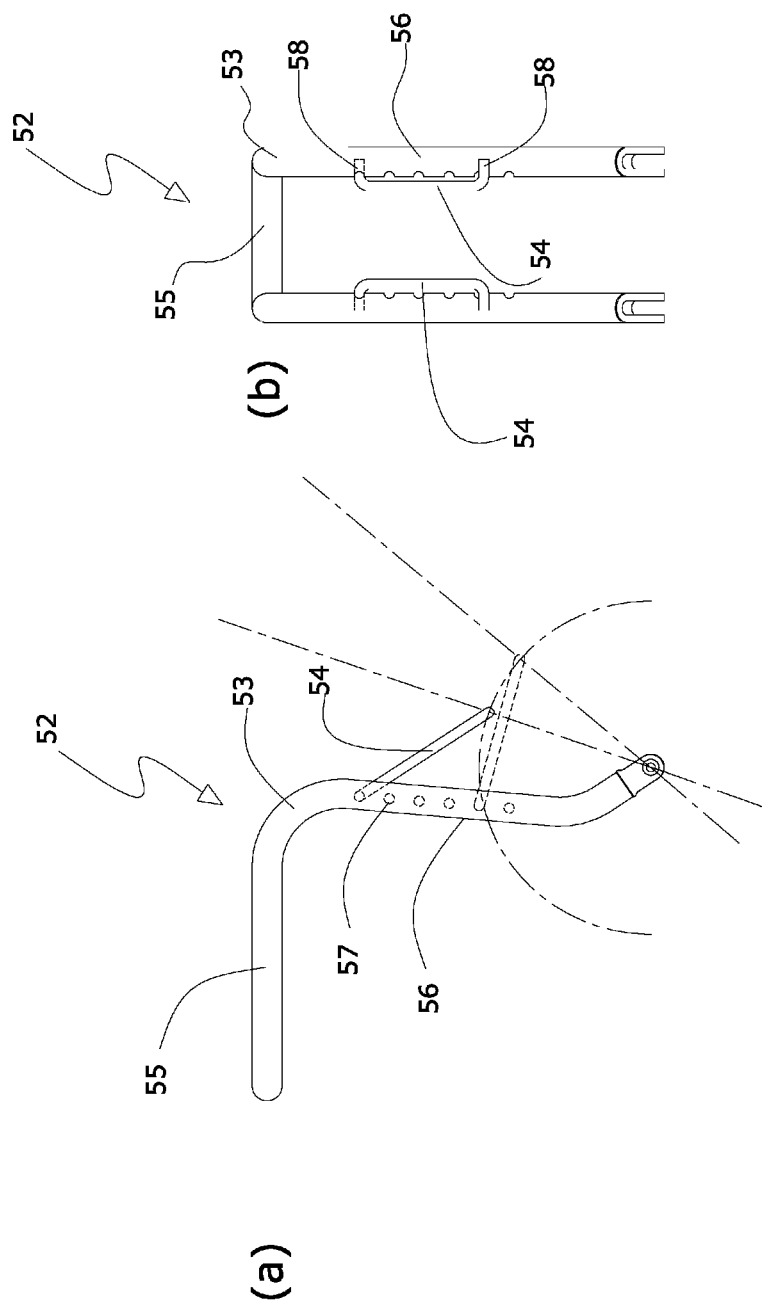
FIG. 8 is (a) a schematic side and (b) end view of a support frame in accordance with one preferred embodiment of the present invention.

With respect to FIG. 8 there is provided a support frame generally indicated by arrow (52) The support frame (52) has a primary member (53) and secondary members (54).

The primary member (53) is substantially U-shaped when viewed end on or from the top. The primary member (53) has a first section (55) and a second section (56).

A number of apertures (57) are positioned along the second section (56) of the primary member (53) to allow for adjustable connection of the second member (54) thereto.

As is shown in FIG. 8(b) the secondary member (54) has two hooked ends (58) for connecting the secondary member (54) to the primary support member (53) and a bracket (not shown).

Figure 9:
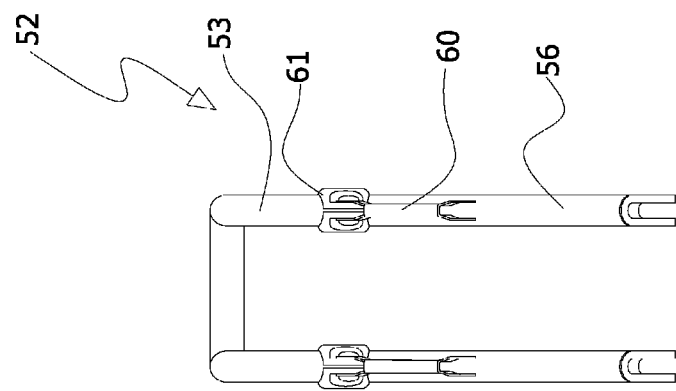
FIG. 9 is (a) a schematic side and (b) end view of an alternative embodiment of the secondary support member of the support frame
Figure 9:
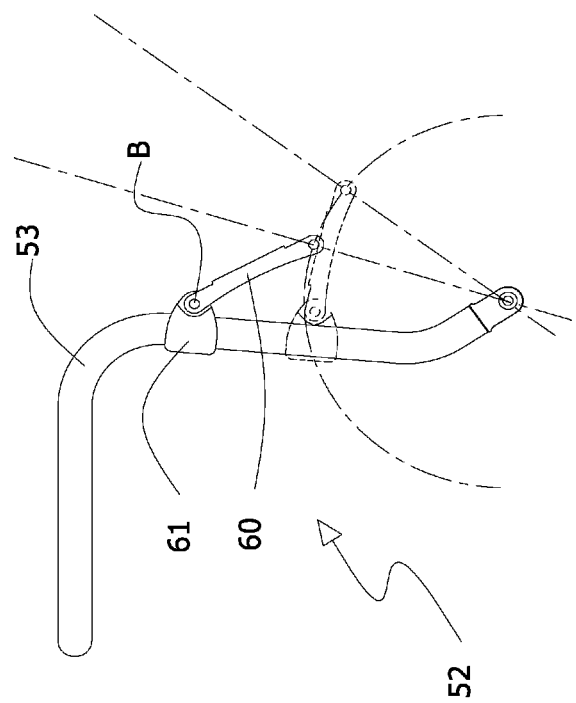

With respect to FIG. 9 there is shown another embodiment of secondary support member (60) which is pivotally connected at one end to a clamp (61). The position of the secondary member (60) is able to be altered as is shown by the dotted lines so that its position can be adjusted to cater for alternative fork angles on different bicycles (not shown). Also shown is a bolt (B) which is tightened to lock the clamp (61) in the desired position on the primary support member (53).

Figure 10:
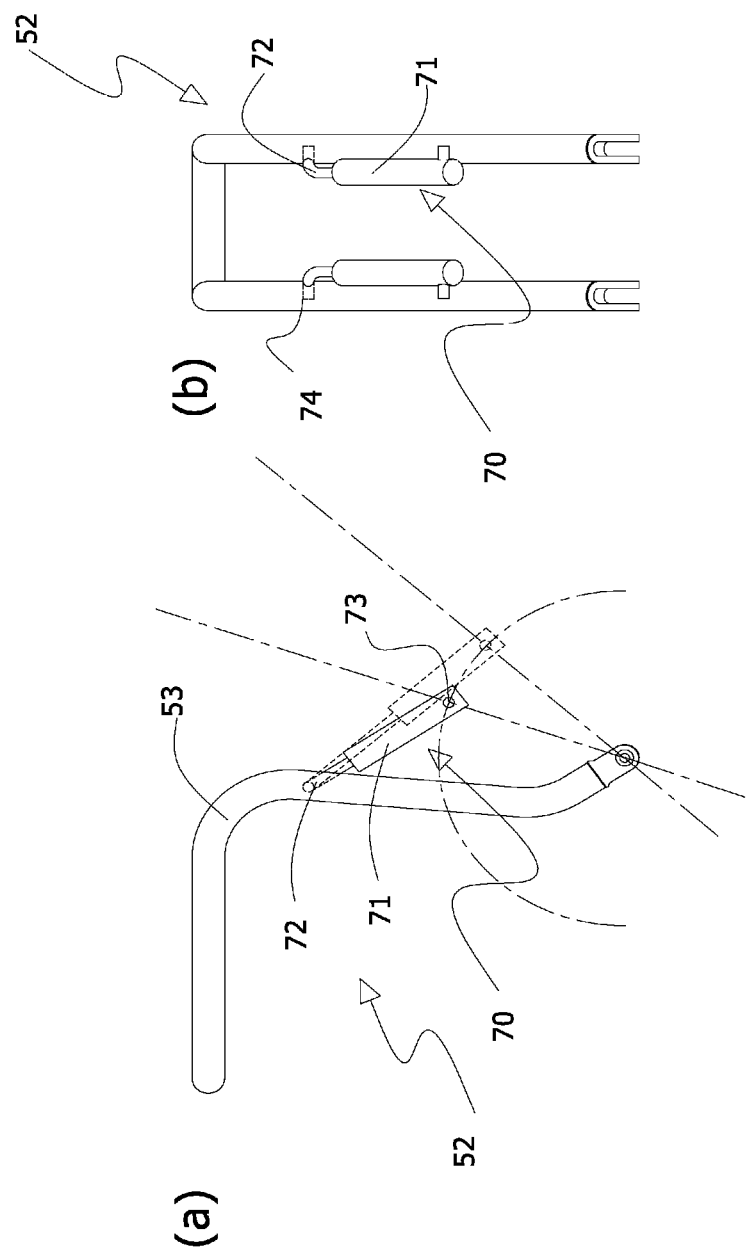
FIG. 10 is (a) a schematic side and (b) end view of a further alternative embodiment of the secondary support member of the support frame.

With respect to FIG. 10 there is shown an alternate secondary support member (70) which has a first section (71) and a second section (72) which are telescopically adjustable with respect to one another. The telescopic adjustment of the two sections (71, 72) allows for the length of the secondary member (70) to be altered. The first section (71) also includes an aperture (73) which allows for the member (70) to be connected to a bracket (not shown) the distal end of the second section (72) includes a hook (74) which allows it to be connected to the primary member (53).

Figure 11:
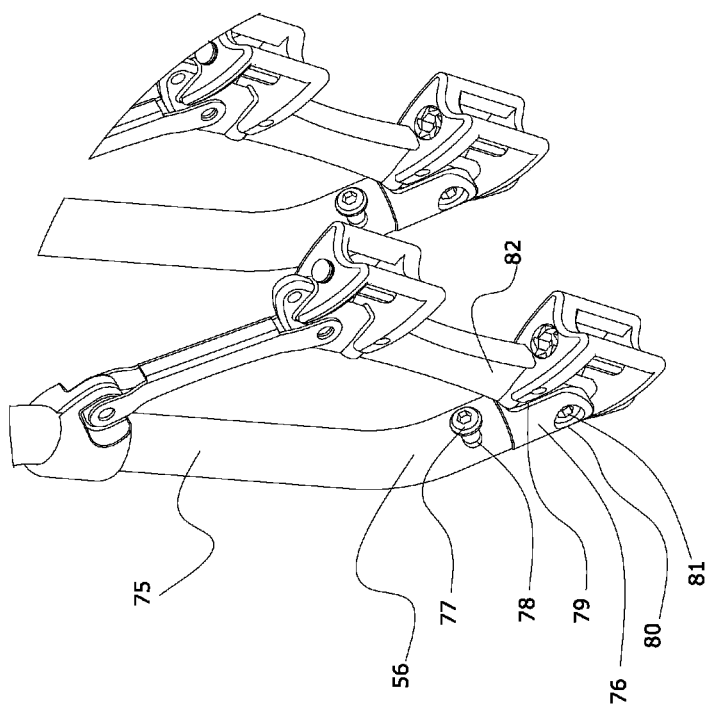
FIG. 11 is a partial perspective view of a primary member and associated attachment portion in accordance with one preferred embodiment of the present invention.

With respect to FIG. 11 there is shown one end of a primary support member (75) which is connected to an attachment portion (76) by means of a bolt (77) which passes through the top section (not shown) of the attachment portion (76) which, extends up into the end of section (56) of the primary member (76). The bolt (77) passes through the primary support member via a lateral slot (78) and an aperture (not shown) in the attachment portion (76).

The lateral slot (78) in primary member (75) allows for angular positioning of the attachment portion (76) with respect to the primary member (75). The attachment portion (76) has a groove (79) as well as a second aperture (80) orthogonal thereto which receives a bolt (81) which connects the attachment portion to a bracket (82).

The ability to adjust the angular angle of the attachment portion (76) and hence the bracket (82) allows the support frame associated with primary member (75) to be connected to the splayed rear forks of a bicycle (not shown).

Figure 12:
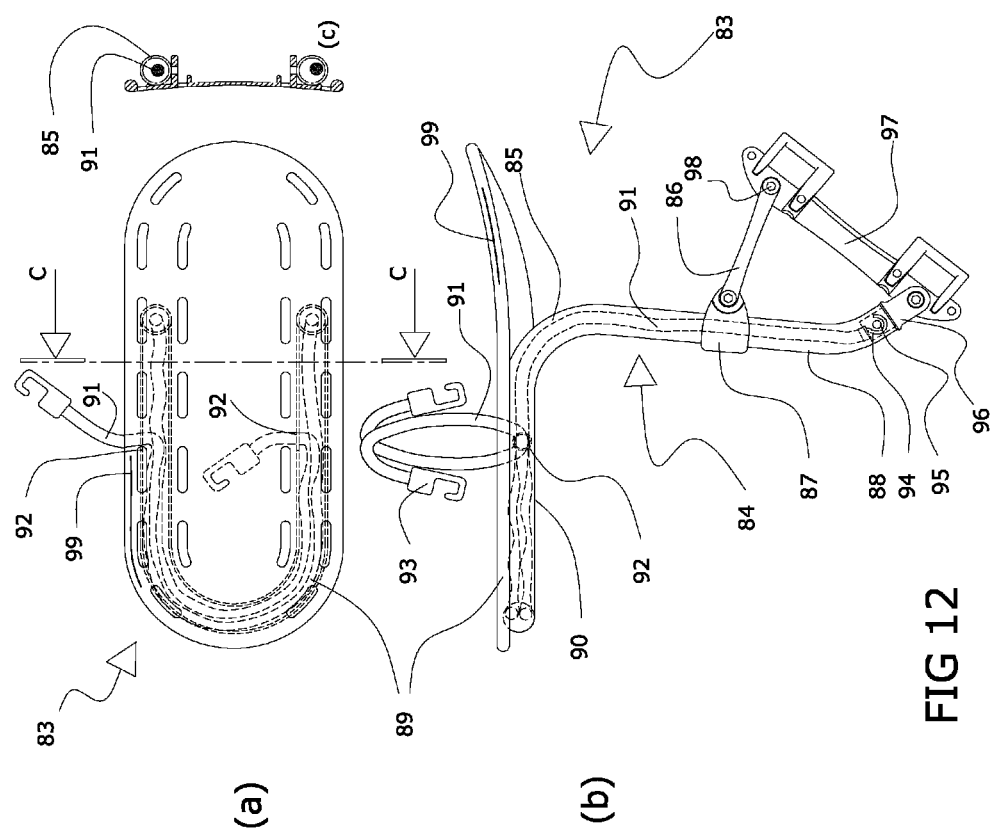
FIG. 12 is a schematic (a) top view, (b) side view, and (c) sectional view along broken line C-C of a support assembly, in accordance with one preferred embodiment of the present invention.

With respect to FIG. 12 there is shown a support assembly generally indicated by arrow (83). The support assembly (83) is generally U-shaped (as are the embodiments shown in FIGS. 8-10) when viewed end on. The support assembly has a support frame generally indicated by arrow (84). The support frame (84) has a primary member (85) and a secondary member (86) connected thereto by means of a clamp (87) on a vertical section (88) of primary member (85).

The support frame (84) includes a plastic deck (89) on a horizontal section (90) of the primary member (85).

The primary member (85) is substantially hollow and has retained therein a retention arrangement in the form of a bungee cord (91). One end of the bungee cord (91) exits the primary member (85) via an aperture (92) in the top section (90) and this end of the bungee cord (91) includes a hook (93) thereon. The other end of the bungee cord (91) is retained within primary member (85) via means of a second hook (94) at the opposite end to that of the hook (93). The hook (94) is secured to a bolt or pin (95) within the attachment portion (96). The bracket (97) is connected to the secondary member (86) at the opposite end to that at which the primary member (85) to the secondary member (86) is attached via a bolt (98).

In use, the hooked end (93) of the bungee cord (91) may be stretched over a load (not shown) resting on deck (89) and secured to a lip (99), on the periphery of the deck (89) to secure the load thereto. On release, the bungee cord (91) retreats back inside the primary member (85).

Figure 13:
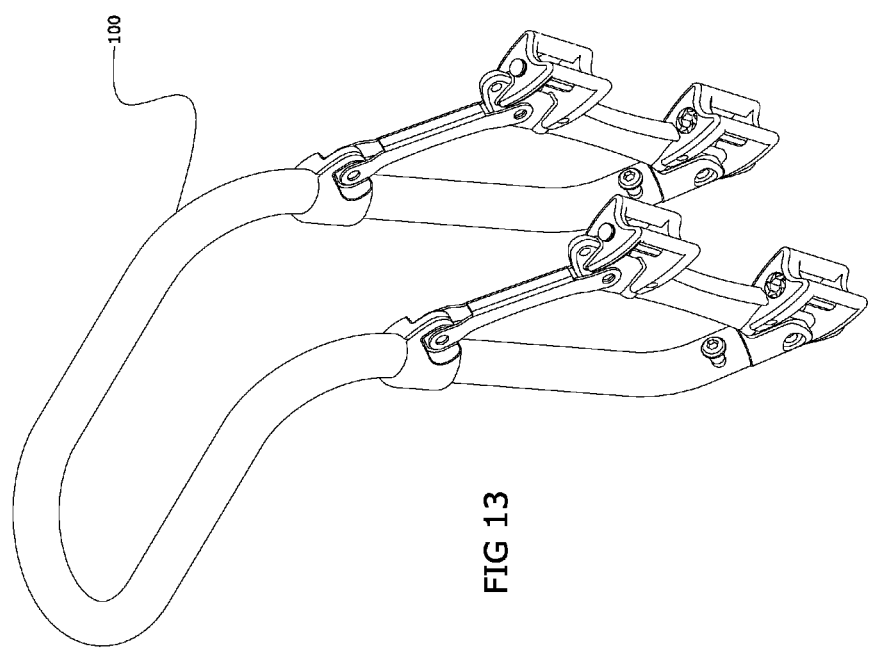
FIG. 13 shows a perspective view of one preferred embodiment of the support assembly as shown in FIG. 12.

FIG. 13 shows the support assembly (100), shown in FIG. 12 in great detail without the deck to aid clarity.

Figure 14:
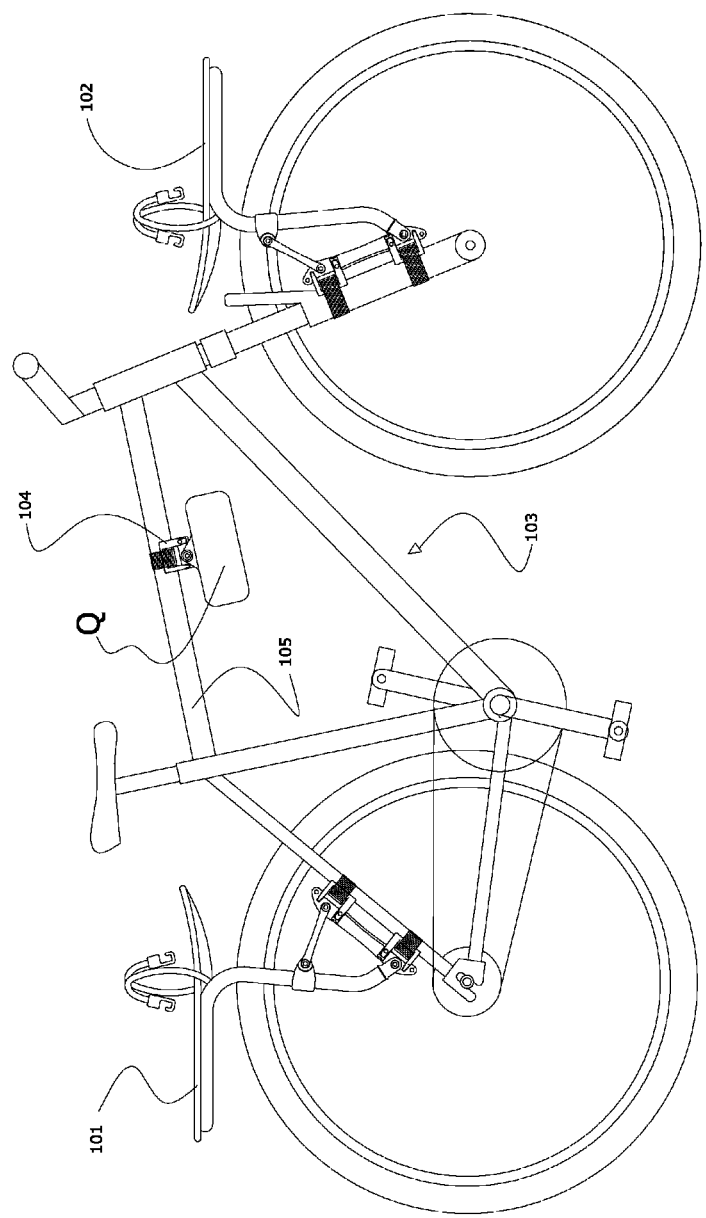
FIG. 14 shows the support assembly in FIG. 12 in use in various positions on a bicycle; also shown is the attachment device in FIG. 1 in use securing an item to a bicycle.

As can be seen in FIG. 14 the support assembly (101, 102) of the present invention can be attached to either the front of back forks of a bicycle (103). Also shown in FIG. 14 is an attachment device (104) securing an accessory item (Q) to the frame (105) of a bicycle (103).

Figure 15:
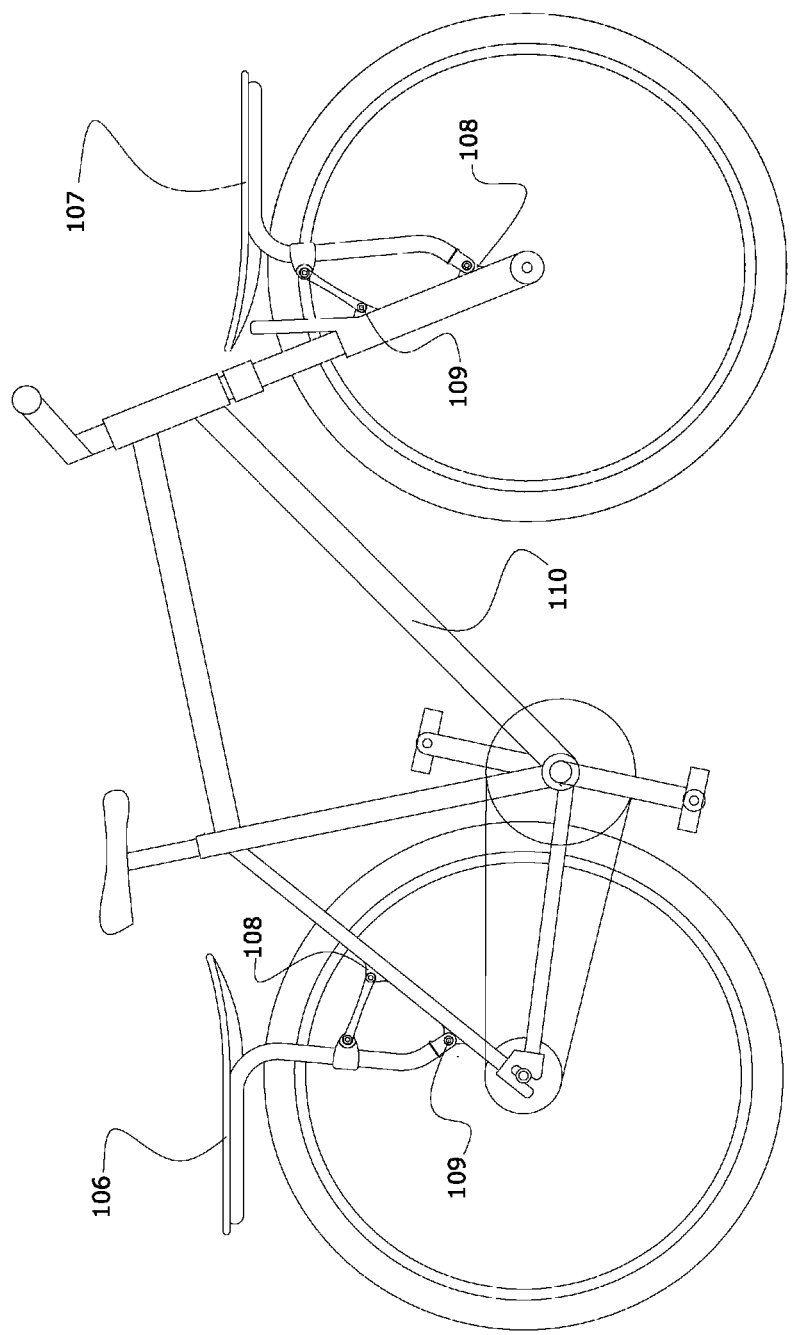
FIG. 15 shows a further embodiment of the support assembly, similar to that in FIG. 12, attached directly to a bicycle in various positions.

FIG. 15 shows two support assemblies (106, 107) attached to connection points in the form of protrusions (108) on the front and rear forks of a bike (110). The protrusions (108) have apertures (not shown) which receive bolts (109) to connect the support assembly to the bike (110).

Aspects of the present invention have been described by way of example only and it should be appreciated that modifications and additions may be made thereto without departing from the scope thereof as defined in the appended claims.

What I claim is:

1. An attachment device which comprises:
   a first body portion and a second body portion to be attached to an object, the first body portion and the second body portion connected by a bar member;
   a length of material fixed to at least one body portion of the attachment device at one end thereof via a loop, the other end of the length of material comprising a free end configured to be passed around an object to which the at least one body portion is to be attached;
   the at least one body portion comprising a gripping mechanism for selectively securing the free end of the length of material and holding the length of material received therein, in a set position, until the gripping mechanism is released, the gripping mechanism comprising a ratchet having a spindle and a pawl and the length of material comprises a strap connected to the at least one body portion, the strap connected to the at least one body portion via means of the loop, the free end of the strap, in use, passing through a slot in the ratchet spindle;
   wherein the pawl is disengaged via a release apparatus, wherein the release apparatus is in the form of a cylindrical rod having an eccentric cam that can interact with the pawl, wherein the cylindrical rod is retained within the at least one body portion, and wherein the cylindrical rod has a suitably shaped aperture or protrusion available to be engaged by a suitably shaped tool for rotation thereof; and
   wherein the looping of the length of material to the at least one body portion positions a portion of the length of material between the at least one body portion and the object to which the attachment device is attached in use and prevents the at least one body portion from directly contacting the object.

2. An attachment device as claimed in claim 1, wherein a section of cushioning material is attached to, formed with, or positioned upon, either: the length of material or the at least one body portion of the bracket, to prevent at least a portion of the at least one body portion from directly contacting the object.

3. An attachment device as claimed in claim 1, wherein the length of material is passed through the at least one body portion and the loop is formed in combination with a section of cushioning material.

4. The attachment device as claimed in claim 3, wherein the cushioning material has one or more slots through which the length of material is passed, and through which the free end of the length of material, is passed back on itself.

5. The attachment device as claimed in claim 1, wherein the at least one body portion comprises a region for attachment of items thereto which are to be supported by the attachment device, the region comprising one or more apertures.

\* \* \* \* \*